(12) United States Patent
Takano (10) Patent No.: US 10,872,635 B2
(45) Date of Patent: Dec. 22, 2020

(54) SPACER AND HARD DISK DRIVE APPARATUS

(71) Applicant: HOYA CORPORATION, Tokyo (JP)

(72) Inventor: Masao Takano, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 16/634,079

(22) PCT Filed: Aug. 31, 2018

(86) PCT No.: PCT/JP2018/032488
§ 371 (c)(1),
(2) Date: Jan. 24, 2020

(87) PCT Pub. No.: WO2019/045074
PCT Pub. Date: Mar. 7, 2019

(65) Prior Publication Data
US 2020/0234731 A1 Jul. 23, 2020

(30) Foreign Application Priority Data
Aug. 31, 2017 (JP) .................................. 2017-167236

(51) Int. Cl.
*G11B 17/028* (2006.01)
*G11B 17/038* (2006.01)
*G11B 25/04* (2006.01)

(52) U.S. Cl.
CPC .......... *G11B 17/028* (2013.01); *G11B 17/038* (2013.01); *G11B 25/04* (2013.01)

(58) Field of Classification Search
CPC ..... G11B 17/038; G11B 17/02; G11B 17/028; G11B 25/043
See application file for complete search history.

(56) References Cited

U.S. PATENT DOCUMENTS

| | | | | |
|---|---|---|---|---|
| 5,724,208 A | * | 3/1998 | Yahata ................... | G11B 17/02 360/98.01 |
| 5,768,052 A | * | 6/1998 | Smith .................... | G11B 17/02 360/98.08 |
| 5,969,902 A | * | 10/1999 | Okumura ............. | G11B 17/038 360/99.08 |
| 6,615,613 B1 | * | 9/2003 | Iwabuchi ................ | C03C 19/00 451/120 |

(Continued)

FOREIGN PATENT DOCUMENTS

| | | |
|---|---|---|
| JP | S62-175980 A | 8/1987 |
| JP | 2001118306 A | 4/2001 |

(Continued)

OTHER PUBLICATIONS

International Search Report in PCT/JP2018/032488 dated Oct. 23, 2018.

*Primary Examiner* — Brian E Miller
(74) *Attorney, Agent, or Firm* — Global IP Counselors, LLP (57) ABSTRACT

When removing magnetic disks and spacers from a hard disk drive apparatus, as necessary, during the assembly of the hard disk drive apparatus, in order to suppress the occurrence of removal failures when removing the spacers using a gripping jig, a surface roughness Rz of an outer circumferential edge surface of a spacer is set to be at least 1.5 µm.

20 Claims, 3 Drawing Sheets

(56) References Cited

U.S. PATENT DOCUMENTS

| | | | |
|---|---|---|---|
| 6,992,858 B2* | 1/2006 | Kaneko | G11B 17/028 360/98.08 |
| 7,239,121 B2* | 7/2007 | Liu | G01N 1/38 204/224 M |
| 8,021,212 B2* | 9/2011 | Chida | B24B 9/065 451/28 |
| 2003/0175471 A1* | 9/2003 | Kaneko | G11B 17/038 428/66.4 |
| 2003/0179494 A1* | 9/2003 | Kaneko | G11B 17/028 360/98.08 |
| 2003/0223280 A1* | 12/2003 | Okumura | G11B 17/02 365/199 |
| 2006/0132976 A1* | 6/2006 | Lee | G11B 23/0035 360/135 |

FOREIGN PATENT DOCUMENTS

| | | |
|---|---|---|
| JP | 2001307452 A | 11/2001 |
| JP | 2002230933 A | 8/2002 |
| JP | 2003045139 A | 2/2003 |
| JP | 2003272336 A | 9/2003 |
| JP | 2003308672 A | 10/2003 |
| JP | 2004348860 A | 12/2004 |

\* cited by examiner

SPACER AND HARD DISK DRIVE APPARATUS

CROSS-REFERENCE TO RELATED APPLICATIONS

This U.S. National stage application of International Patent Application No. PCT/JP2018/032488, filed on Aug. 31, 2018, which, in turn, claims priority under 35 U.S.C. § 119(a) to Japanese Patent Application No. 2017-167236, filed in Japan on Aug. 31, 2017, the entire contents of which are hereby incorporated herein by reference.

BACKGROUND

Field of the Invention

The present invention relates to a ring-shaped spacer to be arranged in contact with a magnetic disk in a magnetic recording hard disk drive apparatus, and a hard disk drive apparatus in which the spacer is used.

Background Information

Following the expansion of cloud computing in recent years, many hard disk drive apparatuses (hereinafter referred to as HDD apparatuses) are used in a data center for a cloud in order to increase the storage capacity. Thus, there are demands for increasing the storage capacity of HDD apparatuses, as compared with that achieved by conventional techniques.

Currently used magnetic disks are configured to make the float distance between a magnetic head and a magnetic disk extremely small in order to install many magnetic disks in an HDD apparatus, but the above-described demands for increasing the storage capacity of HDD apparatuses are not sufficiently satisfied. Therefore, consideration can be given to increasing the number of magnetic disks that are installed in an HDD apparatus.

Incidentally, ring-shaped spacers are provided between magnetic disks installed in an HDD apparatus in order to keep the magnetic disks in a state of being spaced apart from each other. These spacers function to keep the magnetic disks from coming into contact with each other and precisely arrange the magnetic disks at predetermined positions spaced apart from each other. On the other hand, the spacers are in contact with the magnetic disks, and accordingly, if the magnetic disks and the spacers rub against each other, foreign matter, such as minute particles, may be generated by the spacers. In this case, long-term reliability of the HDD apparatus is likely to be impaired by the generated minute particles. Therefore, it is desirable to mitigate minute particles generated at interfaces between the magnetic disks and the spacers.

As such a spacer, a spacer is known that is provided with a conductive coating that is formed on a surface of the spacer after etching is performed on the surface of the spacer using an etching solution (JP 2003-308672A).

It is described that generation of minute particles can be significantly suppressed with this configuration.

Such spacers and magnetic disks are installed in an HDD apparatus by alternately stacking the magnetic disks and the spacers with a spindle of the HDD apparatus passing through inner holes of the magnetic disks and the spacers, and then pressing the magnetic disks and the spacers in an axial direction of the spindle. Further, in order to remove, from the HDD apparatus after installation, a predetermined magnetic disk in which a problem has been found in a performance test or the like, the stacked magnetic disks and spacers are sequentially removed. At this time, installation or removal is performed by gripping the magnetic disks and the spacers using a gripping jig of an assembly apparatus.

In the assembled HDD apparatus, the magnetic disks and the spacers are strongly pressed in the axial direction of the spindle to come into close contact with each other, and therefore there is a case in which it is difficult to remove a spacer that is adhered to a magnetic disk by gripping an outer circumferential edge surface of the spacer using the gripping jig of the assembly apparatus. That is, there is a case in which a spacer adhered to a magnetic disk cannot be separated from the magnetic disk (hereinafter, such a case in which a spacer cannot be separated will be simply referred to as a removal failure).

Further, if a removal failure occurs when removing a spacer using the gripping jig, the outer circumferential edge surface of the spacer and the gripping jig rub against each other, and as a result, foreign matter, such as minute particles (particles), may be generated.

In particular, if the number of magnetic disks installed in an HDD apparatus is increased, the number of spacers provided between the magnetic disks also increases. Accordingly, the number of spacers to be removed increases, and the number of spacers adhered to magnetic disks also increases, and therefore, when removing the spacers using the gripping jig, a removal failure is more likely to occur and minute particles that cause impairment of long-term reliability of the HDD apparatus are likely to be generated.

SUMMARY

Therefore, an object of the present invention is to provide a spacer and an HDD apparatus that can suppress the occurrence of removal failures when removing spacers using a gripping jig, when removing magnetic disks and spacers from an HDD apparatus, as necessary, during the assembly of the HDD apparatus.

One aspect of the present invention is a ring-shaped spacer to be arranged in contact with a magnetic disk in a hard disk drive apparatus.

A surface roughness Rz of an outer circumferential edge surface of the spacer is at least 1.5 µm.

It is preferable that the surface roughness Rz of the outer circumferential edge surface is not larger than 20 µm.

It is preferable that grooves that extend along an outer circumference of the spacer are formed in the outer circumferential edge surface.

It is preferable that a skewness of the outer circumferential edge surface is not larger than 1.2.

The skewness is more preferably not larger than 0.5, and further preferably not larger than 0.

It is preferable that the spacer is made of glass.

It is preferable that a conductive film is formed at least on a main surface of the spacer that comes into contact with the magnetic disk.

Another aspect of the present invention is a hard disk drive apparatus that includes the spacer.

It is preferable that eight or more magnetic disks are installed in the hard disk drive apparatus.

According to the above-described spacer and HDD apparatus, the occurrence of removal failures can be suppressed when removing spacers using a gripping jig, when removing magnetic disks and the spacers from the HDD apparatus as necessary.

DESCRIPTION OF EMBODIMENTS

The following describes a spacer of the present invention in detail.

Figure 1:
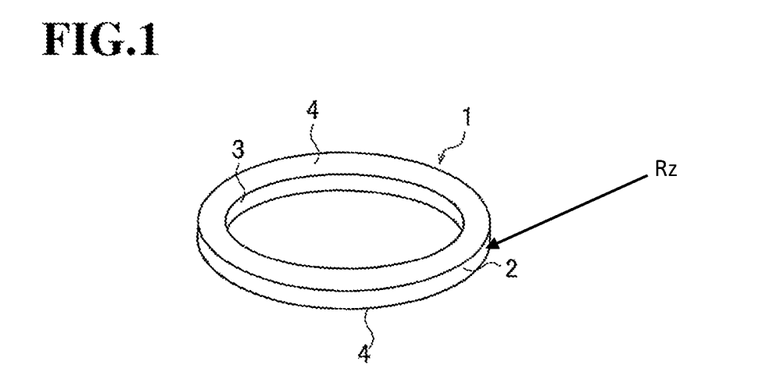
FIG. 1 is an external perspective view of a spacer according to one embodiment.
Figure 2:
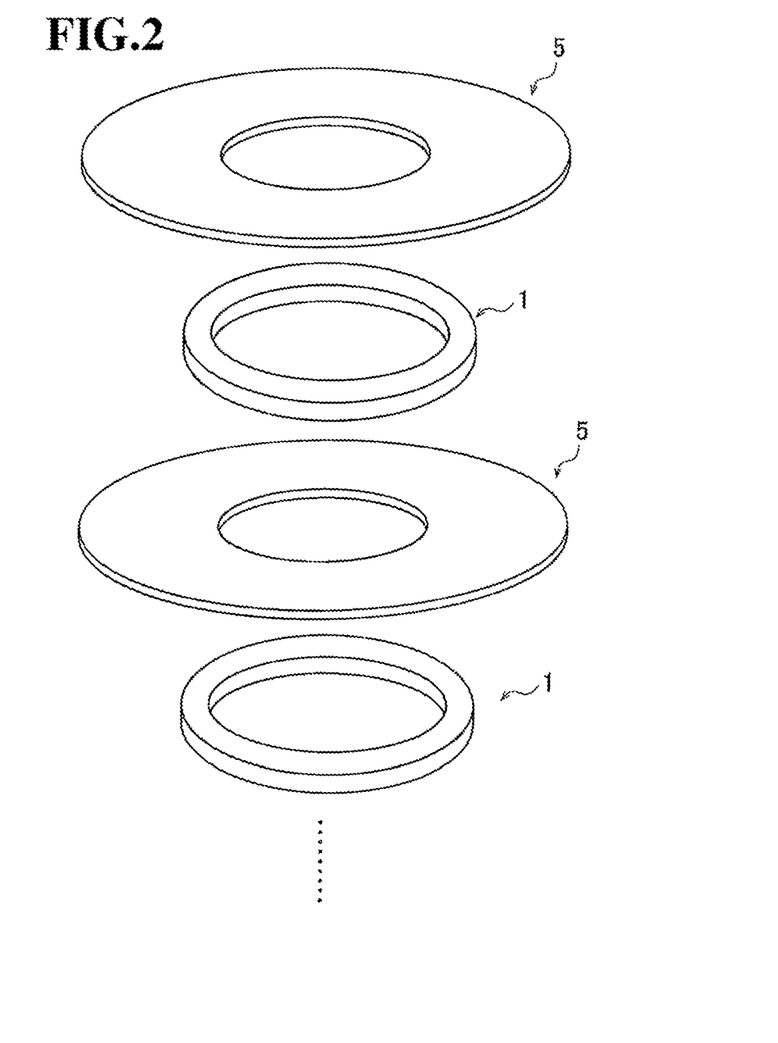
FIG. 2 is a diagram showing an arrangement of spacers according to one embodiment and magnetic disks.
Figure 3:
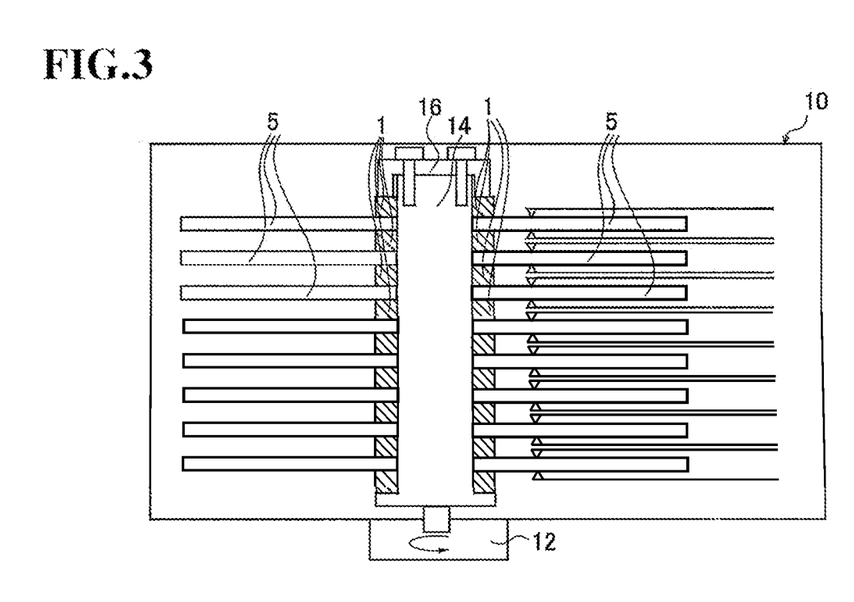
FIG. 3 is a cross-sectional view showing a main portion of an exemplary structure of an HDD apparatus in which spacers according to one embodiment are installed.

FIG. 1 is an external perspective view of a spacer 1 according to one embodiment, and FIG. 2 is a diagram showing an arrangement of spacers 1 and magnetic disks 5. FIG. 3 is a cross-sectional view showing a main portion of an exemplary structure of an HDD apparatus in which the spacers 1 are installed.

The spacers 1 are installed in an HDD apparatus by alternately stacking the magnetic disks 5 and the spacers 1 on each other as shown in FIG. 2. As shown in FIG. 3, the plurality of magnetic disks 5 are fitted to a spindle 14 that is connected to a motor 12 and rotates, such that the spindle 14 passes through the magnetic disks 5 and the spacers 1 are interposed between the magnetic disks 5, and the magnetic disks 5 are fixed using a screw via a top clamp 16 that is located above the magnetic disks 5, and thus the magnetic disks 5 are attached at predetermined intervals.

As shown in FIG. 2, the spacers 1 and the magnetic disks 5 are alternately arranged such that one spacer 1 is located between two magnetic disks 5, and the spacers 1 keep a gap between adjacent magnetic disks 5 at a predetermined distance. It should be noted that, although the spacer 1 described in the following embodiment is provided between two magnetic disks 5 while being in contact therewith, the present invention also applies to a spacer that is in contact with only the uppermost or lowermost magnetic disk 5. It should be noted that there is a case in which the spacer 1 that is in contact with only the uppermost or lowermost magnetic disk 5 is not provided, according to the specifications of the HDD apparatus.

The spacer 1 has a ring shape and includes an outer circumferential edge surface 2, an inner circumferential edge surface 3, and main surfaces 4 that are opposite to each other.

The inner circumferential edge surface 3 is a surface that comes into contact with the spindle 14, and is a wall surface that surrounds a hole that has an inner diameter that is slightly larger than the outer diameter of the spindle 14.

The main surfaces 4 are two surfaces that are parallel to each other and come into contact with the magnetic disks 5. The spacer 1 fixes the magnetic disks 5 using a frictional force while being in close contact with the magnetic disks 5, and the area of contact and the frictional force increase as the surface smoothness of the spacer 1 increases. From this standpoint, the surface roughness Ra of the main surfaces 4 is not larger than 1.0 μm, for example. Preferably, the surface roughness Ra is not larger than 0.5 μm. It should be noted that, as the surface roughness Ra of the main surfaces 4 of the spacer 1 is reduced, an adhesive force that acts between the spacer 1 and the magnetic disks 5 increases. The spacer 1 is particularly effective in such a case.

Here, Ra, Rz, and skewness, which will be described as surface roughness parameters, conform to JIS B 0601-2001. Ra denotes the arithmetical mean surface roughness and Rz denotes the maximum height surface roughness. Surface roughness is calculated by, for example, using data that is measured using a stylus surface roughness measurement device in which a stylus is used. It should be noted that a stylus in which the radius of curvature of a leading end is 2 μm and the taper angle of a cone is 60° can be used. Other measurement/calculation parameters can be set as follows: a measurement length of 80 μm, a measurement resolution (pitch) of 0.1 μm, a scan speed of 0.1 mm/sec, a lowpass filter cut-off value (Ls) of 2.5 μm, and a highpass filter cut-off value (L) of 80 μm.

If the surface roughness parameters are measured using a stylus, surface roughness is measured by moving the stylus in the thickness direction of the spacer 1 to perform scanning. In this case, even if a large number of minute grooves (grooves 6) that extend in the circumferential direction are formed in an entire edge surface of the spacer 1, surface roughness can be accurately evaluated. If scanning is performed by moving the stylus in the circumferential direction, which is the extension direction of the grooves, in measurement of this surface, it may be unable to evaluate irregularities formed by the grooves because the stylus is moved along the grooves. That is, if grooves that extend in one direction are formed in a surface to be measured, scanning is performed by moving the stylus in a direction that is perpendicular to the extension direction of the grooves.

With regard to each of the above-described surface roughness parameters, measurement is performed, for example, five times on a surface of a portion to be evaluated, and an average value of the thus obtained five values can be used as the value of the surface roughness parameter.

The outer circumferential edge surface 2 is an edge surface that does not come into contact with the magnetic disks 5 and the spindle 14. The surface roughness Rz, that is, the maximum height Rz of the outer circumferential edge surface 2, is at least 1.5 μm. Preferably, the surface roughness Rz is not larger than 20 μm.

The surface roughness Rz of the outer circumferential edge surface 2 is set to be at least 1.5 μm so that the spacer 1 can be easily gripped and removed using the gripping jig of the assembly apparatus, when taking out a specific magnetic disk 5 from the HDD apparatus 10 in which the magnetic disks 5 and the spacers 1 are stacked as shown in FIG. 2 and are fitted to the spindle 14 of the HDD apparatus 10. In other words, the surface roughness Rz is set to be at least 1.5 μm in order to make the spacer 1 less likely to slip when the outer circumferential edge surface 2 of the spacer 1 is gripped by the gripping jig to remove the spacer 1 from the spindle 14. The magnetic disks 5 and the spacers 1 are fixed by being pressed against each other using the top clamp 16, and therefore the spacers 1 are likely to adhere to the magnetic disks 5, and a removal failure is likely to occur when removing the spacers 1 using the gripping jig of the assembly apparatus. If the surface roughness Rz is smaller than 1.5 μm, the number of removal failures sharply increases.

A surface roughness Rz larger than 20 μm increases the possibility that, when the spacer is gripped by the gripping jig, a surface of the gripping jig will be scraped by surface irregularities formed in the outer circumferential edge surface 2, and foreign matter, such as particles, will be generated. From this standpoint, it is preferable that the surface roughness Rz is not larger than 20 μm. In order to further reduce the possibility of generation of foreign matter, such as particles, it is more preferable that the surface roughness Rz is not larger than 10 μm.

Further, if the surface roughness Rz is smaller than 2.0 μm, there is a case in which, although a removal failure does not occur, particles are generated as a result of strong friction occurring in removal. Therefore, it is more preferable that Rz is at least 2.0 μm.

According to one embodiment, it is preferable that grooves 6 (scratch marks) that extend along the outer circumference of the spacer 1 are formed in the outer circumferential edge surface 2. In other words, it is preferable that the grooves 6 are formed in the outer circumferential edge surface 2 of the spacer 1, extending in the circumferential direction. It is more preferable that the grooves 6 are formed in the entire outer circumferential edge surface 2. If a chamfered surface is provided, the grooves 6 need not be formed in the chamfered surface. Such grooves 6 can increase the frictional force between the gripping jig of the assembly apparatus and the outer circumferential edge surface 2, and accordingly can suppress the occurrence of a removal failure. Such groves 6 can be seen using a laser optical microscope, an SEM, or the like.

It is preferable that an average width of the grooves 6 is at least 10 μm in terms of ensuring a sufficient frictional force to avoid removal failures. On the other hand, if the grooves 6 are too large, burrs are likely to be generated on ridge lines of protruding portions that are formed between the grooves 6. If there are burrs, particles are likely to be generated when the spacer is gripped, as described later in detail. Therefore, it is preferable that the average width of the grooves 6 is not larger than 300 μm. The average width of the grooves 6 can be roughly calculated based on the number of grooves 6 that are formed within a predetermined length in the thickness direction of the outer circumferential edge surface 2. An average depth of the grooves 6 is preferably not larger than 20 μm, and more preferably not larger than 10 μm.

It should be noted that, in some cases, the outer circumferential edge surface of the spacer is provided with about one to three recesses that extend in the circumferential direction, in order to prevent warping of the magnetic disks 5 during installation, for example. The depth of these recesses is generally at least 100 μm and is apparently larger than the depth of the above-described grooves 6 (scratch marks), and the recesses can be easily visually recognized and can be distinguished from the above-described grooves 6 (scratch marks). It should be noted that the above-described recesses and grooves 6 (scratch marks) can be provided together. In this case, it is sufficient to provide the above-described grooves 6 (scratch marks) at least in portions of the outer circumferential edge surface other than portions in which the recesses are provided.

According to one embodiment, it is preferable that the skewness Sk, which is a parameter that defines the shape of surface irregularities of the outer circumferential edge surface 2, is not larger than 1.2. If the skewness Sk is larger than 1.2, the surface has a shape in which sharp protruding shapes are relatively sparsely dispersed, and therefore it is highly likely that, when the spacer 1 is gripped, sharp protrusions will break or the surface of the gripping jig will be scraped, and foreign matter such as particles will be generated. Although the lower limit value of the skewness Sk is not specifically limited, it is −2, for example. That is, it is more preferable that the skewness Sk is in the range of −2 to +1.2.

The skewness Sk is more preferably not larger than 0.5, and further preferably not larger than 0 in terms of reducing sharp protruding shapes.

In a case in which the above-described grooves 6 (scratch marks) are formed in the outer circumferential edge surface 2, if there are large burrs on protruding portions between the grooves 6, the skewness Sk is likely to be larger than 1.2. From this standpoint as well, it is preferable that the skewness Sk is not larger than 1.2.

The skewness Sk is a dimensionless parameter that is obtained by dividing the cubic mean of measurement data of surface roughness by the cube of a root mean square height of the measurement data of surface roughness. The skewness Sk is used to evaluate symmetry between protruding shapes and valley shapes of surface roughness, and takes a positive value or a negative value. A larger positive value of the skewness Sk indicates surface irregularities that include a larger number of sharp protruding shapes and gentler valley shapes. If the skewness Sk takes a negative value, a larger absolute value of the skewness Sk indicates surface irregularities that include sharper valley shapes and a larger number of gentle protruding shapes.

If surface irregularities have skewness and surface roughness Rz within the predetermined ranges as described above, the frictional force between the gripping jig of the assembly apparatus and the outer circumferential edge surface 2 can be increased to suppress the occurrence of removal failures when removing the spacers 1, and generation of foreign matter such as particles can be suppressed.

Figure 4:
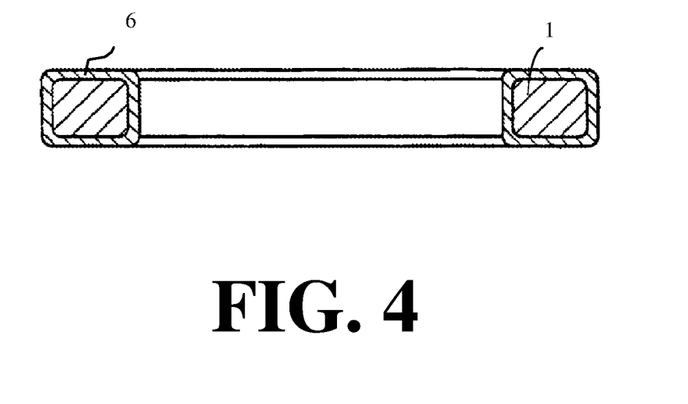
FIG. 4 is a cross-sectional view of a spacer on which a conductive film is formed according to one preferable embodiment.

According to one embodiment, it is preferable that a conductive film 7, such as a metal film, is formed on a surface of the spacer 1, as shown in FIG. 4. Specifically, if the spacer 1 is made of glass, the spacer 1 is an insulator, and therefore static electricity is likely to accumulate in the magnetic disks 5 and the spacer 1. This is not preferable because, if the magnetic disks 5 and the spacer 1 are charged, foreign matter or minute particles are likely to be adsorbed, and a recording element or a reproducing element of a magnetic head may break as a result of the accumulated static electricity being discharged to the magnetic head. Therefore, it is preferable to form a conductive film 7 on the surface of the spacer 1 to make the spacer 1 electrically conductive, in order to eliminate static electricity. The conductive film 7 is formed using an immersion method that is used for plating, such as electroless plating, a vapor-deposition method, a sputtering method, or the like. The conductive film 7 may contain chromium, titanium, tantalum, tungsten, an alloy that contains any of these metals, or a nickel alloy, such as nickel phosphorus (NiP) or nickel tungsten (NiW), for example. It is preferable that the nickel alloy is nonmagnetic.

If the conductive film 7 is formed on the spacer 1, the conductive film 7 is normally formed on the entire surface of the spacer 1, but if static electricity can be released via the spindle 14 (see FIG. 3) to the outside, it is not always necessary to provide the conductive film on the entire spacer 1. If the conductive film is formed on each of the upper and lower main surfaces 4 of the spacer L which come into contact with the magnetic disks 5, for example, a configuration is possible in which the conductive film is formed only on the inner circumferential edge surface 3 out of the outer circumferential edge surface 2 and the inner circumferential edge surface 3, in order to electrically connect the conductive films formed on the upper and lower main surfaces 4 to each other. If the spacer 1 is made of metal, conductive glass, or ceramic, static electricity can be released from the magnetic disks 5 to the outside directly via the spacer 1, and therefore a configuration is also possible in which the conductive film is not provided.

The thickness of the conductive film 7 is only required to be thick enough to achieve electrical conductivity with which the above-described static electricity can be released to the outside, and is 0.01 to 10 μm, for example. Even if such a conductive film 7 is formed on the outer circumferential edge surface 2, the numerical ranges of the surface roughness Rz and the skewness Sk of the conductive film 7 on the outer circumferential edge surface 2 are the above-described ranges because the conductive film 7 is thin.

The above-described spacer 1 is preferably used in an HDD apparatus in which eight or more magnetic disks 5 are installed. If eight or more magnetic disks 5, which is more than six magnetic disks 5 that are normally installed in an HDD apparatus, are installed in an HDD apparatus, the magnetic disks 5 and the spacers 1 need to be more strongly pressed (clamped) against each other using the top clamp 16, and therefore the pressure applied by the top clamp 16 needs to be increased. As a result, the adhesive force between the spacers 1 and the magnetic disks 5 installed in the HDD apparatus is increased, and removal failures are likely to increase when removing the spacers 1 from the magnetic disks 5. Spacers 1 that can suppress the occurrence of removal failures in such a case are preferable. For the same reason, the spacer 1 of this embodiment is more preferably used in an HDD apparatus in which nine or more magnetic disks 5 are installed, and further preferably used in an HDD apparatus in which ten or more magnetic disks 5 are installed.

Although the spacer 1 can be made of glass, ceramic, or metal, the same material as that of a substrate used for the magnetic disk 5 is preferably used for the spacer 1. If the spacer 1 and the magnetic disk 5 have a large difference in the thermal expansion rate, the spacer 1 and the magnetic disk 5 have a large difference in the amount of thermal expansion when the internal temperature of the HDD apparatus changes, and there is a risk that the magnetic disk 5 will warp or its fixed position will be displaced in a radial direction, resulting in the occurrence of an error in reading a recorded signal. With regard to the difference in the thermal expansion rate, for example, {(coefficient of thermal expansion of the material of the spacer)/(coefficient of thermal expansion of the material of the substrate for the magnetic disk)} is preferably 0.8 to 1.2, and more preferably 0.9 to 1.1. If a glass substrate is used as the substrate for the magnetic disk, it is preferable that the spacer 1 is made of glass.

In this case, glass that has substantially the same coefficient of thermal expansion as that of the glass substrate for the magnetic disk 5 is preferably used for the spacer 1. The material of a glass spacer is not specifically limited, and examples of the material include aluminosilicate glass, soda-lime glass, soda aluminosilicate glass, alumino-borosilicate glass, borosilicate glass, quartz glass, and crystallized glass. If the spacer 1 is made of amorphous aluminosilicate glass, the spacer can be made of glass that contains 59 to 63 mass % of silicon dioxide ($SiO_2$), 5 to 16 mass % of aluminum oxide ($Al_2O_3$), 2 to 10 mass % of lithium oxide ($Li_2O$), 2 to 12 mass % of sodium oxide ($Na_2O$), and 0 to 5 mass % of zirconium oxide ($ZrO_2$), for example. This glass is preferable for the spacer 1 in terms of its high rigidity and low coefficient of thermal expansion. An example of soda-lime glass that can be used is amorphous glass that contains 65 to 75 mass % of $SiO_2$, 1 to 6 mass % of $Al_2O_3$, 2 to 7 mass % of CaO, 5 to 17 mass % of $Na_2O$, and 0 to 5 mass % of $ZrO_2$. This glass is relatively soft and easy to grind and polish, and is therefore suitable for the spacer 1 in terms of facilitating an increase in surface smoothness. It should be noted that, if the spacer 1 is made of metal, an aluminum-based or titanium-based alloy (including aluminum alone or titanium alone), stainless steel, or the like can be used.

A blank for the spacer 1 made of glass can be obtained using any method, such as a method of manufacturing a glass plate using a float method, a down draw method, or the like and cutting the glass plate into a ring shape, a method of molding molten glass through pressing, or a method of manufacturing a glass tube through tube drawing and slicing the glass tube to a suitable length. The spacer 1 made of glass is obtained by performing grinding and/or polishing on an edge surface (an outer circumferential edge surface or an inner circumferential edge surface) and main surfaces of the thus formed ring-shaped glass plate.

The method for grinding and/or polishing the edge surface is not specifically limited, and the edge surface can be ground or polished using a formed grindstone that contains abrasive diamond particles of #80 to #1000, for example.

The abrasive diamond particles can be fixed to the grindstone using metal or resin. Alternatively, the edge surface may be polished using a polishing brush that includes bristle materials made of nylon or the like. As is the case with processing that is performed on an edge surface portion of a glass substrate for the magnetic disk, the above-described edge surface processing can be performed by bringing the ring-shaped glass plate, which is a workpiece to be formed into the spacer 1, and the formed grindstone or the polishing brush, which is a tool, into contact with each other while rotating both. Here, the above-described grooves 6 extending in the circumferential direction can be formed in the edge surface by rotating the ring-shaped glass plate about its central axis.

If the grooves 6 extending in the circumferential direction are formed, burrs may be generated on ridge lines of protruding portions between the grooves 6. Specifically, if large grooves are formed and surface roughness is increased, burrs are more likely to be generated. These burrs can be favorably removed while keeping the entire groove shape, by making a pressing force applied by a formed grindstone zero for a period of time in a final stage of grinding that is performed using the grindstone, or, in the case of polishing that is performed using a brush, by reducing a pressing force, reducing the period of time for which the pressing force is applied, or using a soft brush. When forming the grooves 6, it is preferable to roughly form the grooves by performing grinding using a formed grindstone, and then precisely adjust the shape of the grooves by performing edge surface polishing. However, care must be taken not to erase the grooves by performing excessive edge surface polishing. It should be noted that the state of burrs has a relatively strong correlation with the skewness Sk out of the surface roughness parameters. As the size of burrs increases and the frequency of generation of burrs increases, the skewness Sk tends to increase. Therefore, the skewness Sk can be controlled by optimizing grinding and polishing based on the value of the skewness Sk.

Chemical polishing may also be performed using an etching solution that contains hydrofluoric acid or silicofluoric acid.

The outer circumferential edge surface that has a desired surface shape can be formed by performing the above-described grinding and polishing in combination as appropriate.

After the outer circumferential edge surface 2 and the inner circumferential edge surface 3 of the spacer 1 are ground and/or polished, the main surfaces 4 are ground and/or polished.

Although dimensions of the spacer 1 may be changed as appropriate according to the specifications of the HDD into which the spacer 1 is installed, if the spacer 1 is to be used in an HDD apparatus for a nominal size of 3.5 inches, the outer diameter (diameter of the outer circumferential edge surface 2) is 31 to 33 mm, for example, the inner diameter (diameter of the inner circumferential edge surface 3) is 25 mm, for example, and the thickness is 1 to 4 mm, for example. Chamfered surfaces may be provided by chamfering inner circumferential or outer circumferential edge portions of the main surfaces 4, as appropriate.

Experimental Examples

In order to confirm the effects of the spacer 1 of the embodiment, spacers (Samples 1 to 26) having different surface irregularities in the outer circumferential edge surface 2 were manufactured. First, an outer circumferential edge portion and an inner circumferential edge portion of a ring-shaped blank that was cut out from a glass plate were ground using a formed grindstone to form the outer circumferential edge surface 2, the inner circumferential edge surface 3, and a chamfered surface. Next, the main surfaces 4 were subjected to lapping that was performed using loose abrasive particles including alumina particles, polishing that was performed using loose abrasive particles including ceria particles, and washing. The manufactured spacers had an inner diameter of 25 mm, an outer diameter of 32 mm, and a thickness of 2 mm. The chamfered surface had an angle of 45° and a width in a radial direction of 150 μm, and the specifications of the chamfered surface were common between all of the spacers.

In order to form various surface irregularities in the outer circumferential edge surface 2, the size of abrasive particles included in the formed grindstone was changed. In Samples 1 to 11, which will be described later, a pressing force applied by the grindstone was made zero for a period of time in a final stage of grinding so that the skewness Sk of the outer circumferential edge surface fell in the range of −0.5 to 0. In Samples 12 to 26, which will be described later, the skewness Sk was adjusted in respective cases in which the surface roughness Rz of the outer circumferential edge surface 2 was 20 μm, 10 μm, and 2 μm. The skewness Sk was adjusted by adjusting the period of time for which a pressing force with which the sample was pressed against the formed grindstone was made zero in the final stage of grinding, when grinding the sample using the formed grindstone. In all of the samples, the surface roughness Rz of the inner circumferential edge surface 3 was set to 5 μm, and the surface roughness Ra of the main surfaces 4 was set to 0.1 μm. Samples 3 to 26 are working examples, and Samples 1 and 2 are comparative examples.

As for the manufactured spacers of Samples 1 to 11, as shown in FIG. 3, three magnetic disks and four spacers were installed in a test apparatus, which was prepared simulating an HDD apparatus, the magnetic disks and the spacers were pressed against each other using the top clamp 16, and, after the test apparatus was left to stand for 3 minutes, the magnetic disks and the spacers were separately taken out from the apparatus. Such an operation for installing and taking out the magnetic disks and the spacers was counted as a single operation. In each operation, the spacers were installed and taken out by gripping their outer circumferential edge surfaces using a gripping jig of a test apparatus that was prepared simulating a predetermined assembly apparatus. The above operation was repeated ten times, and if one or more removal failures occurred when installing or taking out the spacers ("Yes" in Table 1), the sample was evaluated as not acceptable, and if no removal failure occurred ("No" in Table 1), the sample was evaluated as acceptable. The magnetic disks that were used were obtained by forming a magnetic film or the like on a nominal 3.5-inch glass substrate for a magnetic disk having an outer diameter of 95 mm, an inner diameter of 25 mm, and a thickness of 0.635 mm.

Table 1 below shows Rz of the outer circumferential edge surfaces of the glass spacers and evaluation results of the spacers.

Further, after the operation for installing and taking out was performed ten times, the number of particles attached to surfaces of all of the magnetic disks was visually counted using a converging lamp in a dark room. Each sample was evaluated as any of Levels 1 to 4 based on the number of particles. A lower level indicates a smaller number of particles. Although a spacer that is evaluated as Level 4 poses no problem in practical use, a lower level is preferable in terms of long-term reliability of the HDD apparatus. Evaluation was performed by classifying each sample as any of the levels based on the number of particles.

Level 1: The number of particles is 0 to 5.
Level 2: The number of particles is 6 to 10.
Level 3: The number of particles is 11 to 15.
Level 4: The number of particles is 16 or more.

Table 2 below shows Rz of the outer circumferential edge surfaces of the glass spacers and evaluation results of the spacers.

TABLE 1

|  | Rz [μm] of outer circumferential edge surface | Removal failure |
| --- | --- | --- |
| Sample 1 | 1 | Yes |
| Sample 2 | 1.2 | Yes |
| Sample 3 | 1.5 | No |
| Sample 4 | 2.0 | No |
| Sample 5 | 2.5 | No |
| Sample 6 | 5 | No |
| Sample 7 | 10 | No |
| Sample 8 | 15 | No |
| Sample 9 | 20 | No |
| Sample 10 | 25 | No |
| Sample 11 | 30 | No |

TABLE 2

|  | Rz [μm] of outer circumferential edge surface | Number of particles |
| --- | --- | --- |
| Sample 3 | 1.5 | Level 2 |
| Sample 4 | 2.0 | Level 1 |
| Sample 5 | 2.5 | Level 1 |
| Sample 6 | 5 | Level 1 |
| Sample 7 | 10 | Level 1 |
| Sample 8 | 15 | Level 3 |
| Sample 9 | 20 | Level 3 |
| Sample 10 | 25 | Level 4 |
| Sample 11 | 30 | Level 4 |

As for the manufactured spacers of Samples 12 to 26, eight magnetic disks and nine spacers were installed in a test apparatus, which was prepared simulating an HDD apparatus, the magnetic disks and the spacers were pressed against each other using the top clamp, and, after the test apparatus was left to stand for 30 minutes, the magnetic disks and the spacers were separately taken out from the apparatus. Such an operation for installing and taking out the magnetic disks and the spacers was counted as a single operation, and in each operation, the spacers were installed and taken out by gripping their outer circumferential edge surfaces using a gripping jig of a test apparatus that was prepared simulating a predetermined assembly apparatus. This operation was repeated ten times. The magnetic disks that were used were obtained by forming a magnetic film or the like on a nominal 3.5-inch glass substrate for a magnetic disk having an outer diameter of 95 mm, an inner diameter of 25 mm, and a thickness of 0.635 mm.

Main surfaces of the magnetic disks were scanned before and after the 10 operations, using a laser-type surface defect analyzer, and a difference in the number of particles before and after the operations was calculated to determine the number by which the particles increased. In each group of samples that had the same value of the surface roughness Rz of the outer circumferential edge surface (a group of Samples 12 to 16, a group of Samples 17 to 21, and a group of Samples 22 to 26), an index number of the determined number of particles was calculated for each sample by using, as the basis (100%), the number of particles determined for a sample that had a skewness Sk of 0, and each sample was evaluated as any of A to C ranks based on the calculated index number. The index number was not larger than 130% in any of Samples 12 to 26.

A rank: The index number is not larger than 100%.
B rank: The index number is larger than 100% and not larger than 110%.
C rank: The index number is larger than 110% and not larger than 130%.

It should be noted that a spacer that is evaluated as C rank poses no problem in practical use.

Table 3 shows Rz and the skewness Sk of the outer circumferential edge surfaces of the spacers and evaluation results of the spacers.

TABLE 3

|  | Rz [μm] of outer circumferential edge surface | Skewness Sk | Rank |
|---|---|---|---|
| Sample 12 | 20 | 1.5 | C |
| Sample 13 | 20 | 1.2 | B |
| Sample 14 | 20 | 0.5 | B |
| Sample 15 | 20 | 0.0 | (Basis) |
| Sample 16 | 20 | −1.0 | A |
| Sample 17 | 10 | 1.5 | C |
| Sample 18 | 10 | 1.2 | B |
| Sample 19 | 10 | 0.5 | B |
| Sample 20 | 10 | 0.0 | (Basis) |
| Sample 21 | 10 | −1.0 | A |
| Sample 22 | 2.0 | 1.5 | C |
| Sample 23 | 2.0 | 1.2 | B |
| Sample 24 | 2.0 | 0.5 | B |
| Sample 25 | 2.0 | 0.0 | (Basis) |
| Sample 26 | 2.0 | −1.0 | A |

From Table 1, it can be found that, if the surface roughness Rz of the outer circumferential edge surface is at least 1.5 μm, the spacers can be reliably removed.

From Table 2, it can be found that it is preferable to set the surface roughness Rz of the outer circumferential edge surface to be not larger than 20 μm in terms of reducing the number of particles and ensuring long-term reliability of the HDD apparatus.

From Table 3, it can be found that it is preferable to set the skewness Sk to be not larger than 1.2 in terms of reducing the number of particles and ensuring long-term reliability of the HDD apparatus. It can also be found that it is more preferable that the skewness Sk is not larger than 0.

It should be noted that a conductive film 7 with a constant thickness of 1 μm, specifically, a conductive film made of a Ni—P alloy (P: 10 mass %, Ni: the remaining portion) was formed on the outer circumferential edge surface 2, the inner circumferential edge surface 3, and the main surfaces 4 of the spacers 1 of Sample 5 through electroless plating. The spacers 1 provided with the conductive film 7 were installed in the HDD apparatus 10 shown in FIG. 3. At this time, electrical conduction between the spindle 14 and all of the magnetic disks 5 and the spacers 1 was confirmed using a tester. That is, it can be said that, as a result of the conductive film 7 being formed on the spacers 1, static electricity is unlikely to accumulate in the magnetic disks 5 and the spacers 1 and an effect of suppressing adsorption of foreign matter and minute particles to the magnetic disks 5 and the spacers 1 can be achieved, for example.

Although the spacer and the hard disk drive apparatus of the present invention have been described in detail, the present invention is not limited to the above-described embodiment, working examples, and the like, and it goes without saying that various modifications and changes can be made within a scope not departing from the gist of the present invention.

The invention claimed is:

1. A ring-shaped spacer to be arranged in contact with a magnetic disk in a hard disk drive apparatus,
    wherein a maximum height surface roughness Rz of an outer circumferential edge surface of the spacer is at least 1.5 μm, and
    a skewness of the outer circumferential edge surface is not larger than 1.2.

2. The spacer according to claim 1,
    wherein the maximum height surface roughness Rz of the outer circumferential edge surface is not larger than 20 μm.

3. The spacer according to claim 2,
    wherein the outer circumferential edge surface define grooves that extend along an outer circumference of the spacer, the grooves contributing to a surface roughness of the outer circumferential edge surface having the maximum height surface roughness Rz.

4. The spacer according to claim 2,
    wherein a conductive film is formed on a surface of the spacer.

5. The spacer according to claim 2,
    wherein the spacer is made of glass.

6. The spacer according to claim 1,
    wherein the outer circumferential edge surface defines grooves that extend along an outer circumference of the spacer, the grooves contributing to a surface roughness of the outer circumferential edge surface having the maximum height surface roughness Rz.

7. The spacer according to claim 6,
    wherein the spacer is made of glass.

8. The spacer according to claim 6,
    wherein a conductive film is formed on a surface of the spacer.

9. The spacer according to claim 1,
    wherein the spacer is made of glass.

10. The spacer according to claim 9,
    wherein a conductive film is formed on a surface of the spacer.

11. The spacer according to claim 1,
wherein a conductive film is formed on a surface of the spacer.

12. A hard disk drive apparatus comprising:
a ring-shaped spacer arranged in contact with a magnetic disk in the hard disk drive apparatus,
wherein a maximum height surface roughness Rz of an outer circumferential edge surface of the spacer is at least 1.5 μm, and
a skewness of the outer circumferential edge surface is not larger than 1.2.

13. The hard disk drive apparatus according to claim 12,
wherein eight or more magnetic disks are installed in the hard disk drive apparatus.

14. The hard disk drive apparatus according to claim 13,
wherein the maximum height surface roughness Rz of the outer circumferential edge surface is not larger than 20 μm.

15. The hard disk drive apparatus according to claim 13,
wherein the outer circumferential edge surface defines grooves that extend along an outer circumference of the spacer, the grooves contributing to a surface roughness of the outer circumferential edge surface having the maximum height surface roughness Rz.

16. The hard disk drive apparatus according to claim 13,
wherein the spacer is made of glass.

17. The hard disk drive apparatus according to claim 13,
wherein a conductive film is formed on a surface of the spacer.

18. The hard disk drive apparatus according to claim 17,
wherein the maximum height surface roughness Rz of the outer circumferential edge surface is not larger than 20 μm.

19. The hard disk drive apparatus according to claim 17,
wherein the outer circumferential edge surface defines grooves that extend along an outer circumference of the spacer, the grooves contributing to a surface roughness of the outer circumferential edge surface having the maximum height surface roughness Rz.

20. The hard disk drive apparatus according to claim 17,
wherein the spacer is made of glass.

* * * * *